United States Patent
Ni et al.

(10) Patent No.: US 12,153,287 B2
(45) Date of Patent: Nov. 26, 2024

(54) SUSTAINED FATTY ACID RELEASE FROM CONTACT LENS

(71) Applicant: CooperVision International Limited, Fareham (GB)

(72) Inventors: Jing Ni, Pleasanton, CA (US); Ronghua Liu, Livermore, CA (US)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 0 days.

(21) Appl. No.: 18/370,888

(22) Filed: Sep. 21, 2023

(65) Prior Publication Data
US 2024/0126101 A1 Apr. 18, 2024

Related U.S. Application Data

(60) Provisional application No. 63/410,239, filed on Sep. 27, 2022.

(51) Int. Cl.
*G02C 7/04* (2006.01)

(52) U.S. Cl.
CPC ..................... *G02C 7/04* (2013.01)

(58) Field of Classification Search
CPC .................. G02C 7/04; G02B 1/043
USPC ...................... 351/159.02, 159.04
See application file for complete search history.

(56) References Cited

U.S. PATENT DOCUMENTS

| | | | |
|---|---|---|---|
| 5,942,558 A | 8/1999 | Korb | |
| 6,867,245 B2 | 3/2005 | Iwata et al. | |
| 8,231,218 B2 | 7/2012 | Hong et al. | |
| 8,658,747 B2 | 2/2014 | Liu et al. | |
| 8,865,789 B2 | 10/2014 | Yao et al. | |
| 10,155,349 B2 | 12/2018 | Pruitt et al. | |
| 11,883,533 B2 * | 1/2024 | Klein | A61K 31/79 |
| 2010/0140114 A1 | 6/2010 | Pruitt et al. | |
| 2010/0258961 A1 | 10/2010 | Chang et al. | |
| 2011/0102736 A1 | 5/2011 | Wu et al. | |
| 2011/0133350 A1 | 6/2011 | Qiu et al. | |
| 2013/0148077 A1 | 6/2013 | Samuel et al. | |
| 2014/0178595 A1 | 6/2014 | Bothe et al. | |

(Continued)

FOREIGN PATENT DOCUMENTS

| | | |
|---|---|---|
| AU | 2014221267 A1 | 9/2014 |
| WO | 2011098578 A2 | 8/2011 |

OTHER PUBLICATIONS

PCT Demand filed Apr. 26, 2024 in corresponding International Patent Application No. PCT/GB2023/052476 (20 pages).

(Continued)

*Primary Examiner* — William R Alexander
(74) *Attorney, Agent, or Firm* — Kilyk & Bowersox, P.L.L.C.

(57) ABSTRACT

A fatty acid-releasing contact lens is described as well as method of manufacturing the same. The fatty acid-releasing contact lens comprises a glycerophospholipid loaded to the polymeric lens body and sustains the release of $C_{12}$-$C_{26}$ fatty acid after 1 hour in a release media comprising an $sPLA_2$ enzyme solution. The fatty acid-releasing contact lens can be comfortably worn by a contact lens wearer and can increase the duration of comfortable lens wearing time and/or reduce lens awareness events in a contact lens wearer.

20 Claims, 3 Drawing Sheets

(56) References Cited

U.S. PATENT DOCUMENTS

| | | | | |
|---|---|---|---|---|
| 2017/0119811 A1* | 5/2017 | Klein | ................... | B65D 75/36 |
| 2017/0298297 A1* | 10/2017 | Klein | ..................... | G02C 7/04 |
| 2019/0002609 A1* | 1/2019 | Klein | ................. | A61K 9/1273 |
| 2019/0309188 A1 | 10/2019 | Qiu et al. | | |
| 2020/0332033 A1* | 10/2020 | Klein | ................. | A61K 9/1273 |
| 2020/0405641 A1 | 12/2020 | Van Weerd | | |
| 2022/0047502 A1 | 2/2022 | Cheng et al. | | |
| 2022/0047503 A1 | 2/2022 | Ge et al. | | |
| 2022/0187620 A1 | 6/2022 | Si et al. | | |

OTHER PUBLICATIONS

International Preliminary Report on Patentability issued in corresponding International Patent Application No. PCT/GB2023/052476 dated Jun. 3, 2024 (17 pages).
Chalmers et al., "Contact Lens Dry Eye Questionnaire-8 (CLDEQ-8) and Opinion of Contact Lens Performance," Optometry and Vision Science, Oct. 2012, vol. 89, No. 10, pp. 1435-1442.
Dennis et al., "Phospholipase A2 Enzymes: Physical Structure, Biological Function, Disease Implication, Chemical Inhibition, and Therapeutic Intervention," Chem Rev., Oct. 12, 2011, vol. 111, No. 10, pp. 6130-6185.
Read et al., "Monitoring ocular discomfort using a wrist-mounted electronic logger," Contact Lens and Anterior Eye, (Feb. 2020) https://doi.org/10.1016/j.clae.2020.02.010.
International Search Report and Written Opinion issued in corresponding International Patent Application No. PCT/GB2023/052476 mailed Feb. 2, 2024 (12 pages).

* cited by examiner

SUSTAINED FATTY ACID RELEASE FROM CONTACT LENS

FIELD OF THE INVENTION

This application claims the benefit under 35 U.S.C. § 119(e) of prior U.S. Provisional Patent Application No. 63/410,239, filed Sep. 27, 2022, which is incorporated in its entirety by reference herein.

The field of the invention relates to contact lenses, and particularly, to contact lenses that are more comfortable for contact lens wearers.

BACKGROUND OF THE INVENTION

An estimated 50% of all contact lens wearers experience discomfort while wearing their lenses, and approximately 25% of these contact lens wearers permanently discontinue wearing lenses. Sensations of lens awareness is a primary reason for contact lens dissatisfaction in contact lens wearers. Despite advances in contact lens materials, there remains a need for improved contact lenses that can be comfortably worn by contact lens wearers who otherwise experience sensations of lens awareness while wearing contact lenses that are currently commercially available.

Fatty acids are known to act as comfort agents that when administered to the eye can provide lubrication and alleviate discomfort. Fatty acids that act as comfort agents can be released from a contact lens during wear in amounts sufficient to de-sensitize the eye and therefore reduce discomfort (US Pat. Appln. Publ. No 20220187620). However, some contact lens materials cannot sustain fatty acid release for an entire day.

It is desirable to obtain a sustained fatty acid release rate from a contact lens for the entire duration of lens wear, thereby increasing the duration of time in which a contact lens wearer can comfortably wear contact lenses. Alternatively, or additionally, it is desired to provide an improved contact lens that can be worn by a contact lens wearer.

SUMMARY OF THE INVENTION

A feature of the present invention is to provide a hydrogel contact lens that can release fatty acids, especially $C_{12}$-$C_{26}$ fatty acids such as oleic acid, during lens wearing.

An additional feature of the present invention is to provide a contact lens that can be comfortably worn by a contact lens wearer.

An additional feature of the present invention is to increase the duration of comfortable lens wearing time and/or reduce lens awareness events in a contact lens wearer.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention, in part relates to a hydrogel contact lens comprising a polymeric lens body loaded with phospholipid, wherein the phospholipid is a glycerophospholipid comprising a $C_{12}$-$C_{26}$ acyl group at the sn-2 position. The phospholipid is advantageously susceptible to digestion by secretory phospholipase 2-acylhydrolase (sPLA$_2$) enzymes found in human tears, especially group HA secretory phospholipase 2-acylhydrolase (sPLA$_2$-IIA). The phospholipid present in the contact lens body is advantageously a glycerophospholipid that is susceptible to digestion by sPLA$_2$ enzymes found in human tears, especially sPLA$_2$-IIA when present in the polymeric lens body of a hydrogel contact lens, especially a silicone hydrogel contact lens, such as a stenfilcon A contact lens. A glycerophospholipid comprising a $C_{12}$-$C_{26}$ acyl group at the sn-2 position may be considered to be susceptible to digestion by sPLA$_2$ enzymes when the amount of $C_{12}$-$C_{26}$ fatty acid derived from the digestion of the sn-2 position acyl group that is released from a stenfilcon A lens loaded with at least 200 µg of the glycerophospholipid to an artificial tear fluid (ATF) release medium containing sPLA$_2$ enzyme, is at least 3 times the amount of $C_{12}$-$C_{26}$ fatty acid released to an otherwise identical control ATF release medium lacking phospholipase A$_2$ enzymes, following immersion of identical stenfilcon A contact lenses each loaded with said glycerophospholipid in each release media for 4 hours at 35° C. An exemplary ATF release medium containing sPLA$_2$ enzyme may be that defined in Table 1 below, additionally containing 50 ppm recombinant human sPLA$_2$-IIA and the control release medium lacking phospholipase A$_2$ enzymes may be an otherwise identical ATF release medium lacking phospholipase A$_2$ enzymes. Alternatively, the release medium containing sPLA$_2$ enzyme may be reflex tear solution and the control release medium may be an ATF. For the avoidance of doubt, while the determination of whether a glycerophospholipid is susceptible to digestion by sPLA$_2$ enzymes may be carried out by loading the glycerophospholipid to a stenfilcon A lens, the contact lens of the invention, including contact lenses comprising glycerophospholipids that have been determined to be susceptible to digestion by sPLA$_2$ enzymes need not be stenfilcon A lenses. In all aspects of the invention the contact lens into which a glycerophospholipid that is susceptible to digestion by sPLA$_2$ enzymes may be any contact lens described herein. An example of a phospholipid that is not susceptible to digestion by sPLA$_2$ enzymes found in human tears when present in a silicone hydrogel contact lens body is, for example, 1,2-dimyristoyl-sn-glycero-3-phosphocholine (DMPC), or 1,2-dioleoyl-sn-glycero-3-phosphocholine (DOPC) in the phosphatidylcholine family. The phospholipid present in the contact lens body is advantageously not DMPC. The phospholipid present in the contact lens body may be other than DMPC or DOPC. The phospholipid present in the contact lens body may be other than a glycerophosphocholine or other than a phosphocholine. The phospholipid may be an anionic glycerophospholipid or zwitterionic glycerophospholipid. An anionic glycerophospholipid includes an anionic (negatively charged) substrate group attached to the phospholipid head group (i.e., at the $R^3$ position). The phospholipid may be of the Formula (I):

Formula (I)

in which X is either —O— or —O(CO)—, $R^1$ and $R^2$ are each independently $C_{11-25}$ alkyl, $R^3$ is selected from hydrogen; $C_{1-10}$ polyol (such as glycerol or inositol); ethanolamine (—$CH_2CH_2NH_2$); and serine (—$CH_2CH(NH_2)$ COOH), and salts of phospholipids of the formula (I) (e.g., where $R^3$ is a negative charge or a deprotonated anionic group such as —$CH_2CH(NH_2)COO^-$). Preferably $R^3$ is not choline, i.e., the glycerophospholipid is other than 1,2-dioleoyl-sn-glycero-3-phosphocholine. The hydrogel contact lens of the present invention has been found to sustain the release of $C_{12}$-$C_{26}$ fatty acid thereby enhancing the comfort of the contact lens in a lens wearer and/or increasing the duration of comfortable contact lens wearing time in a contact lens wearer.

In one example, the hydrogel contact lens is capable of releasing 0.01 µg to 50 µg, 0.05 µg to 40 µg, especially 0.1 µg to 25 µg $C_{12}$-$C_{26}$ fatty acid after 1 hour following immersion in an ATF release media containing 50 ppm $sPLA_2$-IIA enzyme solution in phosphate buffered saline (PBS) at 35° C.

Furthermore, the present invention relates to a method of making the hydrogel contact lens of the present invention. The method includes the steps of a) polymerizing a polymerisable composition (as described herein) in a contact lens mold to obtain a polymeric lens body, b) removing the polymeric lens body from the contact lens mold, c) extracting the polymeric lens body in an organic solvent comprising a glycerophospholipid comprising a $C_{12}$-$C_{26}$ acyl group at the sn-2 position, d) hydrating the polymeric lens body in a hydration liquid to obtain the hydrogel contact lens, e) sealing said hydrogel contact lens with packaging solution in a package, and f) autoclaving said package. Hydration step d) may occur prior to extraction step c) in which phospholipid is loaded to the polymeric lens body. If hydration step d) occurs prior to extraction step c) in which phospholipid is loaded to the polymeric lens body, additional hydration steps may be performed after step c).

Furthermore, the present invention relates to a method of correcting the vision of a symptomatic contact lens wearer by providing to a symptomatic contact lens wearer an $C_{12}$-$C_{26}$ fatty acid-releasing hydrogel contact lens, especially an oleic acid-releasing hydrogel contact lens, comprising a polymeric lens body loaded with a glycerophospholipid comprising a $C_{12}$-$C_{26}$ acyl group at the sn-2 position. Advantageously, the fatty acid-releasing hydrogel contact lens increases the duration of comfortable contact lens wearing time and/or reduces lens awareness events in the symptomatic contact lens wearer compared to a control lens that does not contain glycerophospholipid comprising a $C_{12}$-$C_{26}$ acyl group at the sn-2 position. The phospholipid is advantageously a glycerophospholipid that is susceptible to digestion by $sPLA_2$ enzymes found in human tears, especially $sPLA_2$-IIA, when present in the polymeric lens body, such as a glycerophospholipid of the Formula (I). As used herein, a "symptomatic contact lens wearer" is a lens wearer that is classified as symptomatic using the CLDEQ-8 as described by Chalmers et al (see Chalmers et al., *Contact Lens Dry Eye Questionnaire-8 (CLDEQ-8) and opinion of contact lens performance*. Optom Vis Sci 2012; 89(10): 1435-1442.).

Furthermore, the present invention relates to the use of a $C_{12}$-$C_{26}$ fatty acid-releasing hydrogel contact lens containing glycerophospholipid comprising a $C_{12}$-$C_{26}$ acyl group at the sn-2 position by a contact lens wearer to increase the duration of comfortable contact lens wearing time and/or reduce lens awareness events compared to a control lens that does not contain glycerophospholipid comprising a $C_{12}$-$C_{26}$ acyl group at the sn-2 position.

Furthermore, the present invention relates to a use of an amount of glycerophospholipid comprising a $C_{12}$-$C_{26}$ acyl group at the sn-2 position to enhance the comfort of a contact lens, wherein the glycerophospholipid is associated with a polymeric lens body of the contact lens.

Furthermore, the present invention relates to a hydrogel composition for use in reducing the sensation of lens awareness in a contact lens wearer, thereby enhancing the comfort of the contact lens in the contact lens wearer and/or increasing the duration of comfortable contact lens wearing time in a contact lens wearer, the composition comprising (a) a polymeric lens body that is a reaction product of a polymerisable composition, loaded with (b) an amount of glycerophospholipid comprising a $C_{12}$-$C_{26}$ acyl group at the sn-2 position.

In all aspects of the invention, the glycerophospholipid comprising a $C_{12}$-$C_{26}$ acyl group at the sn-2 position is advantageously susceptible to digestion by $sPLA_2$ enzymes found in human tears, especially group IIA $sPLA_2$, when the glycerophospholipid is present in the polymeric lens body of a hydrogel contact lens, especially a silicone hydrogel contact lens. In all aspects of the invention, the contact lens comprising a polymeric lens body loaded with a glycerophospholipid comprising a $C_{12}$-$C_{26}$ acyl group at the sn-2 position may be characterized in that (a) when the contact lens is immersed in a human reflex tears for 4 hours at 35° C., 3 times the amount of $C_{12}$-$C_{26}$ fatty acid degradation products are detected in the reflex tear than when the lens is immersed in an ATF release medium lacking phospholipase $A_2$ enzymes for 4 hours at 35° C.; and/or (b) when the contact lens is immersed in an ATF release medium containing 50 ppm recombinant human group IIa, phospholipase $A_2$ for 4 hours at 35° C., 3 times the amount of $C_{12}$-$C_{26}$ fatty acid degradation products are detected in the reflex tear than when the lens is immersed in an equivalent ATF release medium lacking phospholipase $A_2$ enzymes for 4 hours at 35° C. The phospholipid is typically a glycerophospholipid such as a glycerophospholipid of the formula (I):

Formula (I)

in which X is either —O— or —O(CO)—, $R^1$ and $R^2$ are each independently a $C_{11-25}$ alkyl, $R^3$ group is selected from hydrogen, $C_{1-10}$ polyol, ethanolamine (—$CH_2CH_2NH_2$) and serine (—$CH_2CH(NH_2)COOH$) and salts thereof (e.g., where $R^2$ is a negative charge, or the ethanolamine is protonated as —$CH_2CH_2NH_3^+$).

Further aspects of the invention are provided in the following numbered clauses:
1. An unworn hydrogel contact lens sealed in a package, the contact lens comprising a polymeric lens body loaded with a glycerophospholipid comprising a $C_{12}$-$C_{26}$ acyl group at the sn-2 position.
2. The contact lens of clause 1 wherein the glycerophospholipid is susceptible to digestion by secretory phospholipase $A_2$ ($sPLA_2$) enzymes found in human tears when present in the polymeric lens body.
3. The contact lens of clause 1 or clause 2, wherein the glycerophospholipid is of the formula (I):

Formula (I)

in which X is either —O— or —O(CO)—, $R^1$ and $R^2$ are each independently a $C_{11-25}$ alkyl and $R^3$ group is selected from hydrogen, $C_{1-10}$ polyol, ethanolamine and serine, and salts thereof.

4. The contact lens of clause 3, wherein $R^1$ and $R^2$ are each independently a $C_{13-21}$ alkyl.
5. The contact lens of any preceding clause, wherein the glycerophospholipid is a phosphatidylserine, phosphatidylethanolamine or phosphatidylglycerol.
6. The contact lens of clause 5, wherein the glycerophospholipid is a phosphatidylglycerol, especially 1,2-dioleoyl phosphatidylglycerol, 1-palmitoyl-2-oleoyl phosphatidylglycerol, 1-stearoyl-2-oleoyl or 1,2-didocosahexaenoyl phosphatidylglycerol.
7. The contact lens of any one of clauses 1 to 4, wherein the glycerophospholipid is other than dimyristoyl phosphatidylcholine (DMPC).
8. The contact lens of any one of clauses 1 to 4, wherein the glycerophospholipid is other than a phosphatidylcholine.
9. The contact lens of any of clauses 1 to 8, wherein the contact lens is a silicone hydrogel contact lens.
10. The contact lens of any of clauses 1 to 9, wherein hydrogel is neutral or cationic.
11. The contact lens of any of clauses 1 to 10, wherein the polymeric lens body is a reaction product of a polymerisable composition that comprises at least one hydrophilic monomer comprising a vinyl group.
12. The contact lens of any of clauses 1 to 11, wherein the polymeric lens body is a reaction product of a polymerisable composition that comprises a first siloxane having the structure represented by Formula (II), Formula (II)

m = 5-6; n = 80-90; p = 7-8 and a second siloxane having the structure represented by Formula (III),

Formula (III)

13. The contact lens of any preceding clause, wherein the hydrogel contact lens releases $C_{12}$-$C_{26}$ fatty acid and salts thereof when in contact with a solution comprising sPLA$_2$-IIA, wherein $C_{12}$-$C_{26}$ fatty acid is a digestion product of the glycerophospholipid.
14. The contact lens of any preceding clause, wherein the polymeric lens body is loaded with an amount of from 1 μg to 1000 μg, preferably from 25 μg to 300 μg, glycerophospholipid.
15. The contact lens of any preceding clause, wherein when immersed in a release media comprising artificial tear fluid containing 50 ppm PLA$_2$-IIA at 35° C., the contact lens sustains the release of at least 0.05 μg/hr $C_{12}$-$C_{26}$ fatty acid, especially at least 0.1 μg/hr $C_{12}$-$C_{26}$ fatty acid, or 1 μg/hr $C_{12}$-$C_{26}$ fatty acid for at least 4 hours, such as for at least 8 hours, optionally for at least 10 hours.
17. The contact lens of any preceding clause, having an equilibrium water content of at least 40%.
18. The contact lens of any preceding clause, wherein the package comprises:
    (a) a base member having a cavity that retains a packaging solution; and
    (b) a cover that forms a liquid-tight seal with the base member.
19. A method of making the hydrogel contact lens of any preceding clause, the method comprising: a) polymerizing a polymerisable composition in a contact lens mold to obtain the polymeric lens body, b) removing the polymeric lens body from the contact lens mold, c) extracting the polymeric lens body in an organic solvent comprising a glycerophospholipid comprising a $C_{12}$-$C_{26}$ acyl group at the sn-2 position, d) hydrating the polymeric lens body in a hydration liquid to obtain the hydrogel contact lens, e) sealing the hydrogel contact lens with packaging solution in a package and, optionally, f) autoclaving the package.
20. A method for correcting vision of a symptomatic contact lens wearer, said method comprising wearing the hydrogel contact lens of any of clauses 1 to 18 by the symptomatic contact lens wearer.
21. The method of clause 20, wherein the symptomatic contact lens wearer has an increased duration of comfortable contact lens wearing time compared to a control lens.
22. The method of clause 20 or clause 21, wherein the symptomatic contact lens wearer has reduced lens awareness and/or fewer "lens awareness events" during the day compared to a control lens.
23. Use of an amount of a glycerophospholipid comprising a $C_{12}$-$C_{26}$ acyl group at the sn-2 position to enhance the comfort of a contact lens, wherein the glycerophospholipid is associated with a polymeric lens body of the contact lens.
24. The use of clause 23, wherein the contact lens is the hydrogel contact lens of any of clauses 1 to 16.
25. The use of clause 23 or clause 24, wherein the sensation of lens awareness is reduced in a contact lens wearer, thereby enhancing the comfort of the contact lens in the symptomatic contact lens wearer and/or increasing the duration of comfortable contact lens wearing time in a symptomatic contact lens wearer.
26. A hydrogel composition for use in reducing the sensation of lens awareness in a contact lens wearer, thereby enhancing the comfort of the contact lens in the contact lens wearer and/or increasing the duration of comfortable contact lens wearing time in a contact lens wearer, the composition comprising (a) a polymeric lens body that is a reaction product of a polymerisable composition, loaded with (b) an amount of glycerophospholipid comprising a $C_{12}$-$C_{26}$ acyl group at the sn-2 position.
27. The composition for use of clause 26 wherein the composition is in the form of the contact lens of any of clauses 1 to 18.

DETAILED DESCRIPTION

Hydrogel contact lenses that sustain release of $C_{12}$-$C_{26}$ fatty acid during wear and their method of manufacture are described herein. The contact lens can be referred to, herein, as a $C_{12}$-$C_{26}$ fatty acid-releasing contact lens. $C_{12}$-$C_{26}$ fatty acid is released from the lens during wear in amounts that enhance the comfort of contact lens wear in contact lens wearers, and can increase the duration of time in which a contact lens wearer can comfortably wear contact lenses. In particular, the $C_{12}$-$C_{26}$ fatty acid-releasing lens of the invention can increase the end-of-day comfort of lens wear in symptomatic patients. The $C_{12}$-$C_{26}$ fatty acid may be a TRPV1 antagonist, for example oleic acid.

Figure 1:
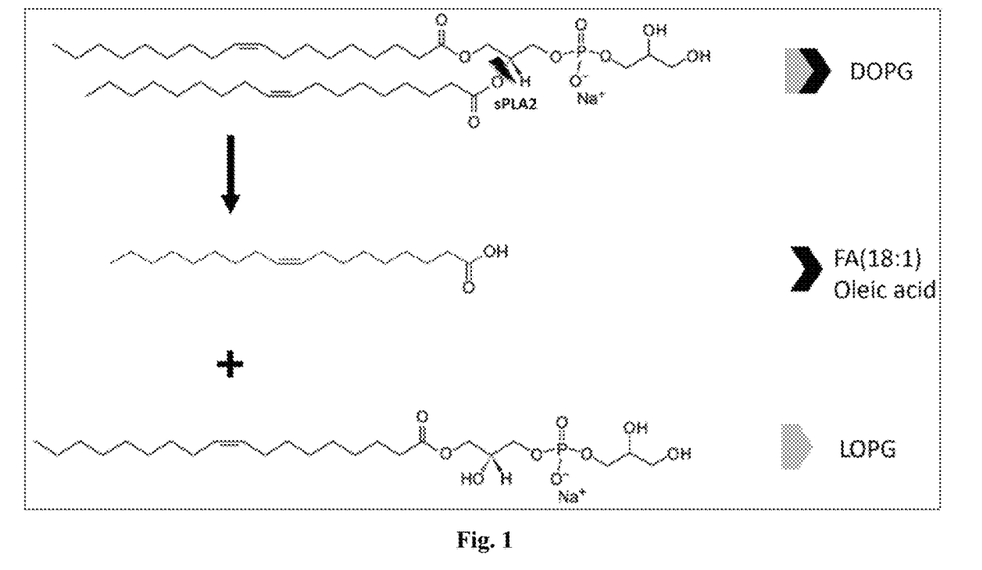
FIG. 1 depicts the enzymatic hydrolysis of dioleylphosphatidylglycerol (DOPG) at the sn-2 ester bond by PLA$_2$ to yield oleic acid and lysophosphatidylglycerol (LOPG).

The present disclosure advantageously provides for sustained $C_{12}$-$C_{26}$ fatty acid release from hydrogel contact lenses whereby glycerophospholipid, such as oleic acid-containing glycerophospholipid, associated with hydrogel contact lenses decompose to release $C_{12}$-$C_{26}$ fatty acid, especially oleic acid. For an effective $C_{12}$-$C_{26}$ fatty acid release rate, the $C_{12}$-$C_{26}$ fatty acid-group must occupy the sn-2 (middle) position in the glycerophospholipid structure. A $C_{12}$-$C_{26}$ fatty alcohol- or fatty acid-group may occupy the sn-1 (end) position in the glycerophospholipid structure. The sn-1 fatty acid can be an alternative fatty acid to that at the sn-2 position, i.e., a fatty acid with a different number of carbon atoms. For example, the fatty acid in the sn-2 position may be oleic acid or docosahexaenoic acid and the fatty acid in the sn-1 position may be a fatty acid other than oleic acid or docosahexaenoic acid. In one example, the glycerophospholipid is a 2-oleoyl glycerophospholipid, especially a 2-oleoyl phosphatidylglycerol such as 1,2-dioleoyl-sn-glycero-3-phospho-rac-(1-glycerol), sodium salt (DOPG). In another example, the glycerophospholipid is a 2-docosahexaenoyl phosphatidylglycerol, such as 1,2-di (4Z,7Z,10Z,13Z,16Z,19Z)-docosa-4,7,10,13,16,19-hexaenoyl sn-glycero-3-phospho-rac-(1-glycerol), sodium salt (DHA-PG). In the example of DOPG, oleic acid is the fatty acid at both sn-1 and sn-2 positions of phosphatidylglycerol. As shown in FIG. 1, when DOPG-loaded lens is placed on an eye, DOPG is degraded by tear enzyme sPLA$_2$-IIA.

Glycerophospholipids comprising a $C_{12}$-$C_{26}$ acyl group at the sn-2 position may be degraded by the group IIA secretory phospholipase A$_2$ (sPLA$_2$-IIIA) enzymes found in human tears. The glycerophospholipid may, for example, be phosphatatidic acid, phosphatidylserine, phosphatidylethanolamine, phosphatidylinositol, phosphatidylglycerol or bisphosphatidyl glycerol. Preferably the glycerophospholipid is other than a phosphocholine. Phosphcholines have been found to be less susceptible to degradation by the group IIA sPLA$_2$-IIA enzymes found in human tears than other glycerophospholipids. Advantageously, the glycerophospholipid is selected from phosphatidylserine, phosphatidylethanolamine, phosphatidylinositol and phosphatidylglycerol, especially phosphatidylethanolamine or phosphatidylglycerol. The pKa of the amino-group of phosphatidylethanolamine (PE) or phosphatidylserine (PS) is preferably in the range of 8-10, preferably in the range of 8.5-9.8. Further information on the activity of sPLA$_2$ enzymes is found in Chem Rev. 2011 Oct. 12; 111(10): 6130-6185, "*Phospholipase A2 Enzymes: Physical Structure, Biological Function, Disease Implication, Chemical Inhibition, and Therapeutic Intervention*", by Dennis et al.

By "susceptible to digestion" the sPLA2 present in human tears will hydrolyze the acyl group at the sn2 position of the glycerophospholipid resulting in a free fatty acid and a lysophospholipid.

The glycerophospholipid is digestible by the human tear. The glycerophospholipid is digestible from at least the sPLA2 present in human tears.

The $C_{12}$-$C_{26}$ fatty acid at the sn-2 position is advantageously released and eluted from the lens, while the remainder of the glycerophospholipid is retained within the lens. The release rate of the $C_{12}$-$C_{26}$ fatty acid may depend on the kinetic of the enzymatic reaction of the phospholipid, in addition to the diffusion rate of the $C_{12}$-$C_{26}$ fatty acid itself. In one embodiment, the hydrogel contact lens comprises a polymeric lens body loaded with 2-oleoyl glycerophospholipid of the formula (Ia):

Formula (Ia)

in which X is either —O— or —O(CO)—, $R^1$ is a $C_{11-25}$ alkyl, $R^3$ group is selected from hydrogen, $C_{1-10}$ polyol, ethanolamine (—CH$_2$CH$_2$NH$_2$) and serine (—CH$_2$CH(NH$_2$)COOH), and salts thereof (e.g. where $R^3$ is a negative charge, or the ethanolamine is protonated as —CH$_2$CH$_2$NH$_3^+$). $R^3$ is advantageously selected from —CH$_2$CH$_2$NH$_2$, —CH$_2$CH(NH$_2$)COOH and —CH$_2$CH(OH)CH$_2$OH, especially —CH$_2$CH(OH)CH$_2$OH. $R^1$ may, for example, be selected from oleoyl, myristoyl, pentadecanoyl, palmitoyl or stearoyl.

The $C_{12}$-$C_{26}$ fatty acid-releasing contact lens comprises a polymeric lens body loaded with an amount of a glycerophospholipid comprising a $C_{12}$-$C_{26}$ acyl group at the sn-2 position that sustains release of $C_{12}$-$C_{26}$ fatty acid from the lens when in contact with a tear solution comprising sPLA$_2$-IIA. The tear solution can be human reflex tear or an in vitro release media comprising ATF comprising group IIA sPLA$_2$ enzyme solution, e.g., at a concentration of 50 ppm.

As an option, one or more glycerophospholipids as described herein can be present in the $C_{12}$-$C_{26}$ fatty acid-releasing contact lens of the present invention (e.g., two different, three different or more glycerophospholipids as described herein).

As one example, the contact lens is a non-silicone hydrogel that contains no or essentially no silicon-containing components, which is a reaction product of a polymerisable composition for a non-silicone hydrogel. A hydrogel containing less than 3 wt %, especially less than 2 wt %, preferably less than 1 wt %, of units derived from monomers or macromers that contain silicon is a non-silicone hydrogel that contains essentially no silicon-containing components. Non-silicone hydrogel contact lenses are typically formed from polymerization of one or more hydrophilic monomers such as 2-hydroxyethyl methacrylate (HEMA) or vinyl alcohol, optionally in combination with other monomers, and contains no siloxane molecule. The polymeric lens body of the hydrogel contact lens may, for example, be a reaction product of a polymerisable composition that comprises at least one monomer of N-vinylpyrrolidone, (hydroxyethyl) methacrylate, glycidyl methacrylate, ethylene glycol dimethacrylate and/or polycarbonates or any combination thereof, wherein the composition optionally contains no siloxane monomers or macromers.

The hydrogel contact lens may be a silicone hydrogel. As an example, the silicone hydrogel contact lens comprises a polymeric lens body that is the reaction product of a polymerisable composition comprising at least one siloxane monomer or macromer and at least one hydrophilic monomer and/or at least one hydrophilic polymer. Conveniently, as described in more detail below, a cured polymeric lens body for a silicone hydrogel may be extracted in an extraction solvent containing the glycerophospholipid. Consequentially, the desired amount of glycerophospholipid becomes associated with the polymeric lens body. The glycerophospholipid may be adhered to the polymeric lens body by electrostatic and/or hydrophobic interaction, and/or may be physically entrapped by the polymer network of the polymeric lens body. Alternatively, or additionally, the glycerophospholipid may be added to the polymerisable composition, e.g. prior to curing.

Advantageously, the hydrogel, i.e the conventional hydrogel or silicone hydrogel, is neutral or positively charged (i.e. cationic), preferably neutral. The term 'neutral' refers to units derived from non-ionic or zwitterionic molecules. The presence of an overall negative charge has been found to inhibit the activity of the sPLA$_2$ enzyme and thus reduce the release of $C_{12}$-$C_{26}$ fatty acid from the glycerophospholipid-containing contact lens. Preferably the contact lens does not contain anionic units such as units derived from methacrylic acid (MAA) or 2-methacryloxy ethyl phosphate (MOEP).

The polymeric lens body typically has an equilibrium water content (EWC) of at least 40%, such as at least 45%. Advantageously, hydrogel contact lens is a high water content contact lens having polymeric lens body with an EWC of at least 50%. The contact lens may be a US Food and Drug Administration (FDA) group II, non-ionic high water content lens or an FDA group IV, ionic high water content lens that is cationic or a silicone hydrogel contact lens having an EWC of at least 40% or at least 45%. Advantageously the contact lens is an FDA group II, non-ionic high water content lens or a silicone hydrogel contact lens having an EWC of at least 40% or at least 45%. It has been found that EWC of greater than 40% leads to increased sPLA$_2$ enzyme activity leading to fatty acid release.

The amount of glycerophospholipid "loaded to" or "associated with" the polymeric lens body refers to the total amount of glycerophospholipid that can be extracted from the contact lens by an isopropyl alcohol (IPA) extraction method as described in Example 2 below. The glycerophospholipid associated with the polymeric lens body may be embedded within the matrix of the polymeric material or attached to the polymeric material, e.g. via hydrogen bonds or electrostatic interactions. Advantageously, glycerophospholipid associated with the polymeric lens body is not removed when the lens is immersed in deionized water or a standard contact lens packaging solution, such as phosphate buffered saline or phosphate buffered saline containing 75 ppm polyvinylpyrrolidone (PVP). Advantageously, no more than 20% by weight, especially no more than 10% by weight, of the glycerophospholipid is extracted from the polymeric lens body into deionized water on immersing the lens in 5 mL deionized water. In one example, glycerophospholipid is loaded to the polymeric lens body in a loading solution comprising an alcohol, such as ethanol and 2-oleoyl phospholipid ranging from 1-10 mg/mL. The loading solution may, for example, comprise approximately 60% ethanol and approximately 40% water. In one specific example, the loading solution comprises 2 mg/mL glycerophospholipid. The lens may be immersed in the loading solution at 25° C. for 3 hours in order to load the glycerophospholipid to the polymeric lens body. In another example, the amount of 2-oleoyl phospholipid associated with the polymeric lens body can be at least about 1 μg, 25 μg, 50 μg, 100 μg, 200 μg or 300 μg up to about 400 μg, 500 μg, 600 μg, 700 μg, 800 μg, 900 μg or 1000 μg, such as about 300 μg to about 1000 μg. Preferably the amount of glycerophospholipid associated with the polymeric lens body is from 100 μg, to 1000 μg, especially from 300 μg to 800 μg.

The glycerophospholipid may have the formula (I):

Formula (I)

in which X is either —O— or —O(CO)—, $R^1$ and $R^2$ are each independently $C_{11-25}$ alkyl, and $R^3$ is selected from hydrogen, $C_{1-10}$ polyol, ethanolamine (—CH$_2$CH$_2$NH$_2$) and serine (—CH$_2$CH(NH$_2$)COOH), or salt of the glycerophospholipid of the formula (I) (e.g., where $R^3$ is a negative charge, or $R^3$ is protonated ethanolamine: —CH$_2$CH$_2$NH$_3^+$).

$R^1$ and $R^2$ are each independently saturated or unsaturated alkyl groups, the term "alkyl" as used herein both referring to aliphatic groups having a saturated alkyl chain and to groups having an unsaturated alkenyl chain unless otherwise stated. $R^1$ and $R^2$ may each independently have a straight (i.e., unbranched) or branched alkyl or alkenyl chain. $R^1$ and $R^2$ are each independently unsubstituted or substituted, for example substituted with hydroxyl, $C_{1-12}$ alkyl (e.g., methyl, ethyl, propyl or butyl), polyethylene glycol (PEG), saccharides, epoxy and any combination thereof, especially unsubstituted or substituted with hydroxyl or methyl. Optionally, $R^1$ and $R^2$ are each independently $C_{11-23}$, especially $C_{13-21}$ alkyl, wherein $R^1$ and $R^2$ are each independently optionally unsaturated and includes at least one unsaturated C═C double bond. Optionally, $R^1$ and $R^2$ are each independently —(CH$_2$)$_{7-11}$CH═CH(CH$_2$)$_{1-9}$CH$_3$, or —(CH$_2$)$_{8-10}$CH═CH(CH$_2$)$_{1-7}$CH$_3$, such as —(CH$_2$)$_{10}$CH═CH(CH$_2$)$_1$CH$_3$, —(CH$_2$)$_8$CH═CH(CH$_2$)$_7$CH$_3$ or —(CH$_2$)$_{10}$CH═CH (CH$_2$)$_3$CH$_3$. Optionally, $R^1$ and $R^2$ are each independently oleoyl, oleic acid having the IUPAC name: (9Z)-octadec-9-enoic acid. Optionally, $R^1$ and $R^2$ are each independently —(CH$_2$)$_{1-4}$[CH═CH(CH$_2$)$_{1-2}$]$_{3-7}$CH$_3$ such as —(CH$_2$)$_2$[CH═CH(CH$_2$)]$_6$CH$_3$. Optionally, $R^1$ and $R^2$ are each independently docosahexaenoyl, docosahexaenoic acid having the IUPAC name (4Z,7Z,10Z,13Z,16Z,19Z)-docosa-4,7,10, 13,16,19-hexaenoic acid. Advantageously, $R^2$ is a $C_{11-25}$ unsaturated alkyl group, preferably a $C_{11-23}$ alkyl group, for example, a $C_{13-21}$ alkyl group including at least one unsaturated C═C double bond, preferably one C═C double bond. $R^2$ optionally has straight (i.e., unbranched) alkyl chains. Optionally, $R^2$ is —(CH$_2$)$_{7-11}$CH═CH(CH$_2$)$_{1-9}$CH$_3$ or —(CH$_2$)$_{8-10}$CH═CH(CH$_2$)$_{1-7}$CH$_3$, such as —(CH$_2$)$_{10}$CH═CH(CH$_2$)$_1$CH$_3$, —(CH$_2$)$_8$CH═CH(CH$_2$)$_7$CH$_3$ or —(CH$_2$)$_{10}$CH═CH(CH$_2$)$_3$CH$_3$. $R^2$ may be selected from oleoyl, palmitoyl, stearoyl or docosahexaenoyl, for example, oleoyl, or docosahexaenoyl, especially oleoyl. Advantageously, $R^1$ is a $C_{11-25}$ unsaturated alkyl group, preferably a $C_{11-23}$ alkyl group, for example, a $C_{13-21}$ alkyl group including at least one unsaturated C═C double bond, preferably one C═C double bond. Optionally, $R^1$ has straight (i.e., unbranched) alkyl chains. Optionally, $R^1$ is —(CH$_2$)$_{7-11}$CH═CH(CH$_2$)$_{1-9}$CH$_3$ or —(CH$_2$)$_{8-10}$CH═CH (CH$_2$)$_{1-7}$CH$_3$, such as —(CH$_2$)$_{10}$CH═CH(CH$_2$)$_1$CH$_3$, —(CH$_2$)$_8$CH═CH(CH$_2$)$_7$CH$_3$ or —(CH$_2$)$_{10}$CH═CH (CH$_2$)$_3$ CH$_3$. $R^1$ may be selected from oleoyl, palmitoyl, stearoyl or docosahexaenoyl.

$R^3$ is a group selected from hydrogen, a $C_{1-10}$ polyol, ethanolamine (—CH$_2$CH$_2$NH$_2$) and serine (—CH$_2$CH (NH$_2$)COOH), and salts thereof, especially, a $C_{1-10}$ polyol, and ethanolamine (—CH$_2$CH$_2$NH$_2$), and salts thereof. $R^3$ is advantageously selected from —CH$_2$CH$_2$NH$_2$ and —CH$_2$CH(OH)CH$_2$OH. A polyol is an organic compound containing multiple hydroxyl-groups. Optionally, the glycerophospholipid is a phosphatidylglycerol. Non-limiting examples of a suitable glycerophospholipids include 1,2-dioleoyl phosphatidylglycerol, 1,2-dimyristoyl phosphatidylglycerol, 1,2-dipentadecanoyl phosphatidylglycerol, 1-myristoyl-2-oleoyl phosphatidylglycerol, 1-pentadecanoyl-2-oleoyl phosphatidylglycerol, 1-palmitoyl-2-oleoyl phosphatidylglycerol, 1-stearoyl-2-oleoyl phosphatidylglycerol, 1,2-didocosahexaenoyl phosphatidylglycerol, 1-myristoyl-2-docosahexaenoyl phosphatidylglycerol, 1-pentadecanoyl-2-docosahexaenoyl phosphatidylglycerol, 1-palmitoyl-2-docosahexaenoyl phosphatidylglycerol, 1-stearoyl-2-docosahexaenoyl phosphatidylglycerol, 1-docosahexaenoyl-2-oleoyl hosphatidylglycerol, and 1-oleoyl-2-docosahexaenoyl phosphatidylglycerol. 2-oleoyl phosphatidylglycerols, such as 1,2-dioleoyl phosphatidylglycerol have been found to be particularly suitable.

As used herein, and unless context dictates otherwise, a reference to an amount of $C_{12}$-$C_{26}$ fatty acid released from the $C_{12-26}$ fatty acid-releasing contact lens over a specified duration of time or to a "release profile" of the $C_{12}$-$C_{26}$ fatty acid, refers to the amount of $C_{12}$-$C_{26}$ fatty acid released from the lens as measured using the in vitro release media (the ATF as described in Table 1 below with the addition of 50 ppm PLA$_2$-IIA, e.g. recombinant human, group IIA, phospholipase 2-acylhydrolase enzyme or bee venom sPLA$_2$, as described in Example 4 below). The contact lens may have an in vitro $C_{12-26}$ fatty acid release profile of at least 0.05

μg/hr or from 0.05 μg/hr to 50 μg/hr $C_{12-26}$ fatty acid from the lens, such as 0.1 μg/hr to 25 μg/hr, or from 0.5 μg/hr to 10 μg/hr, or from 1 μg/hr to 5 μg/hr $C_{12}$-$C_{26}$ fatty acid from the lens, following initial immersion into the release media at 35° C. Advantageously, the contact lens sustains the release of $C_{12-26}$ fatty acid for at least 4 hours, such as for at least 8 hours, optionally for at least 10 hours. Advantageously, the contact lens releases from 0.05 μg/hr to 50 μg/hr $C_{12-26}$ fatty acid from the lens, such as 0.01 μg/hr to 25 μg/hr, or from 0.5 μg/hr to 10 μg/hr, or from 1 μg/hr to 5 μg/hr $C_{12}$-$C_{26}$ fatty acid per hour for at least the first 10 hours following immersion in the release media at 35° C. Thus, the contact lens of the invention loaded with phospholipid is of the formula (I) may have an in vitro $C_{12-26}$ fatty acid release profile of at least 0.05 μg/hr, preferably at least 0.1 μg/hr, such as 0.1 μg/hr to 25 μg/hr, for example 0.5 μg/hr to 10 μg/hr, or 1 μg/hr to 5 μg/hr $C_{12}$-$C_{26}$ fatty acid from the lens for at least 4 hours, such as for at least 8 hours, optionally for at least 10 hours, determined by placing the lens into a 6 mL glass file containing 3 mL of the in vitro release media (the ATF as described in Table 1 with the addition of 50 ppm sPLA$_2$), shaking the vials at 50 rpm in a 35° C. incubator, and at 2 hour increments (e.g. 2 hr, 4 hr, 6 hr, 8 hr and 10 hr) removing a 2.5 ml sample of release media from the vial and analyzing the sample for $C_{12}$-$C_{26}$ fatty acid content by liquid chromatography-mass spectrometry (LCMS) and replacing 2.5 ml of fresh release media into vial, and continuing to incubate the lens in the vial in the shaker for a further 2 hours until the next increment.

As an option, the contact lens of the present invention does not contain any comfort agents except for the presence of the glycerophospholipid as described herein.

As an option, the contact lens of the present invention can contain one or more comfort agents that are different from the glycerophospholipid as described herein. The amount of any other comfort agent can be less than the amount of the glycerophospholipid present. The amount of any other comfort agent can be less than 300 ug, less than 100 ug, less than 50 ug, less than 10 ug, or less than 1 ug.

As an option, the packaging solution as described herein does not contain any comfort agents.

As an option, the packaging solution as described herein does not contain any comfort agents except for the possible presence of glycerophospholipid and/or a fatty acid resulting from the glycerophospholipid originally present in the contact lens.

As an option, the only phospholipid present in the contact lens or associated with the contact lens is a glycerophospholipid.

As an option, the only source of a fatty acid released or present with the contact lens is from the glycerophospholipid present.

The present invention has the ability to provide an improved controlled release of a fatty acid compared to a free fatty acid being associated with the contact lens (not sourced from a glycerophospholipid). For instance, the release can be more linear compared to a free fatty acid being only used/associated with the contact lens.

The release of the fatty acid from the digestion of the glycerophospholipid can be considered a tear-controlled release of the fatty acid.

The polymeric lens body may comprise any hydrogel material suitable for use as a contact lens material. A non-silicone hydrogel material for contact lenses is typically formed by curing a polymerisable composition (i.e., a monomer mixture) comprising at least one hydrophilic monomer or at least one hydrophilic polymer, or a combination thereof. The polymerisable composition for forming a non-silicone hydrogel lens material typically contains no or essentially no silicon-containing components, especially no or essentially no siloxane monomers or macromers. The polymerisable composition for forming a non-silicone hydrogel lens material may contain no more than 3 wt % silicone-containing components, especially no more than 2 wt % silicone-containing components, such as no more than 1 wt % silicon-containing components. A silicone hydrogel material for contact lenses is typically formed by curing a polymerisable composition (i.e., a monomer mixture) comprising at least one siloxane monomer or macromer and at least one hydrophilic monomer or at least one hydrophilic polymer, or a combination thereof. As used herein, the terms "siloxane monomer" refers to molecules that contains at least one Si—O group and at least one polymerisable functional group. "Siloxane macromers" refers to a silicon-containing molecule with at least one polymerisable functional group which, although used as monomers, possess sufficiently high molecular weight and enough internal monomer units to be considered polymeric. Typically, siloxane macromers contain a siloxane chain with at least 5 siloxane (—Si—O—) units and/or have a molecular weight of at least 500 Daltons.

Siloxane monomers and macromers used in contact lens compositions are well-known in the art (see, e.g., U.S. Pat. Nos. 8,658,747 and 6,867,245). (All patents and publications mentioned here and throughout are incorporated in their entirety by reference.) In some examples, the polymerisable composition comprises a total amount of siloxane monomer or macromer of at least 10 wt. %, 20 wt. %, or 30 wt. % up to about 40 wt. %, 50 wt. %, 60 wt. %, or 70 wt. %. Unless specified otherwise, as used herein, a given weight percentage (wt. %) of a component of the polymerisable composition is relative to the total weight of all polymerisable ingredients and interpenetrating polymer network (IPN) polymers (as described further below) in the polymerisable composition. The weight of the polymerisable composition contributed by components, such as diluents, that do not incorporate into the final contact lens product are not included in the wt. % calculation.

In a specific example, the polymerisable composition comprises a hydrophilic vinyl monomer. As used-herein, a "hydrophilic vinyl monomer" is any siloxane-free (i.e., contains no Si—O groups) hydrophilic monomer having a polymerisable carbon-carbon double bond (i.e., a vinyl group) present in its molecular structure that is not part of an acryl group, where the carbon-carbon double bond of the vinyl group is less reactive than the carbon-carbon double bond present in a polymerisable methacrylate group under free radical polymerization. As used herein, the term "acryl group" refers to the polymerisable group present in acrylate, methacrylates, acrylamides, etc. Thus, while carbon-carbon double bonds are present in acrylate and methacrylate groups, as used herein, such polymerisable groups are not considered to be vinyl groups. Further, as used herein, a monomer is "hydrophilic" if at least 50 grams of the monomer are fully soluble in 1 liter of water at 20° C. (i.e., ~5% soluble in water) as determined visibly using a standard shake flask method. In various examples, the hydrophilic vinyl monomer is N-vinyl-N-methylacetamide (VMA), or N-vinyl pyrrolidone (NVP), or 1,4-butanediol vinyl ether (BVE), or ethylene glycol vinyl ether (EGVE), or diethylene glycol vinyl ether (DEGVE), or any combination thereof. In one example, the polymerisable composition comprises at least 10 wt. %, 15 wt. %, 20 wt. %, or 25 wt. % up to about 45 wt. %, 60 wt. %, or 75 wt. % of a hydrophilic vinyl monomer. As used herein, a given weight percentage of a particular class of component (e.g., hydrophilic vinyl monomer, siloxane monomer, or the like) in the polymerisable composition equals the sum of the wt. % of each ingredient in the composition that falls within the class. Thus, for example, a polymerisable composition that comprises 5 wt. % BVE and 25 wt. % NVP and no other hydrophilic vinyl monomer, is said to comprise 30 wt. % hydrophilic vinyl monomer. In one example, the hydrophilic vinyl monomer is a vinyl amide monomer. Exemplary hydrophilic vinyl amide monomers are VMA and NVP. In a specific example, the polymerisable composition comprises at least 25 wt. % of a vinyl amide monomer. In a further specific example, the polymerisable composition comprises from about 25 wt. % up to about 75 wt. % of VMA or NVP, or a combination thereof. Additional hydrophilic monomers that may be included in the polymerisable composition are N,N-dimethylacrylamide (DMA), 2-hydroxyethyl methacrylate (HEMA), ethoxyethyl methacrylamide (EOEMA), ethylene glycol methyl ether methacrylate (EGMA), and combinations thereof.

In addition, or as an alternative to a hydrophilic monomer, the polymerisable composition may comprise a non-polymerisable hydrophilic polymer, which results in a polymeric lens body comprising an interpenetrating polymer network (IPN) with the non-polymerisable hydrophilic polymer interpenetrating the silicone hydrogel polymer matrix. In this example, the non-polymerisable hydrophilic polymer is referred to as an IPN polymer, which acts as an internal wetting agent in the contact lens. In contrast, polymer chains within the silicone hydrogel network that form by polymerization of monomers present in the polymerisable composition are not considered to be IPN polymers. The IPN polymer may be a high molecular weight hydrophilic polymer, for example from about 50,000 to about 500,000 Daltons. In a specific example, the IPN polymer is polyvinylpyrrolidone (PVP). In other examples, the polymerisable composition is substantially free of polyvinylpyrrolidone or other IPN polymer.

As an option, one or more non-silicon containing hydrophobic monomers can be present as part of the polymerisable composition. A hydrophobic monomer can be understood to be any monomer for which 50 grams of the monomer are not visibly fully soluble in 1 liter of water at 20° C. as determined using a standard shake flask method. Examples of suitable hydrophobic monomers include methyl acrylate, or ethyl acrylate, or propyl acrylate, or isopropyl acrylate, or cyclohexyl acrylate, or 2-ethylhexyl acrylate, or methyl methacrylate (MMA), or ethyl methacrylate, or propylmethacrylate, or butyl acrylate, or 2-hydroxybutyl methacrylate, or vinyl acetate, or vinyl propionate, or vinyl butyrate, or vinyl valerate, styrene, or chloroprene, or vinyl chloride, or vinylidene chloride, or acrylonitrile, or 1-butene, or butadiene, or methacrylonitrile, or vinyltoluene, or vinyl ethyl ether, or perfluorohexylethylthiocarbonylaminoethyl methacrylate, or isobornyl methacrylate (IBM), or trifluoroethyl methacrylate, or hexafluoroisopropyl methacrylate, or tetrafluoropropyl methacrylate, or hexafluorobutyl methacrylate, or any combinations thereof.

The hydrophobic monomer, if used, can be present in the reaction product of the polymerisable composition in amounts of from 1 wt. % to about 30 wt. %, such as from 1 wt. % to 25 wt. %, from 1 wt. % to 20 wt. %, from 1 wt. % to 15 wt. %, from 2 wt. % to 20 wt. %, from 3 wt. % to 20 wt. %, from 5 wt. % to 20 wt. %, from 5 wt. % to 15 wt. %, from 1 wt. % to 10 wt. %, based on the total weight of the polymerisable composition.

The polymerisable composition may additionally comprise at least one cross-linking agent. As used herein, a "cross-linking agent" is a molecule having at least two polymerisable groups. Thus, a cross-linking agent can react with functional groups on two or more polymer chains so as to bridge one polymer to another. The cross-linking agent may comprise an acryl group or a vinyl group, or both an acryl group and a vinyl group. In certain examples, the cross-linking agent is free of siloxane moieties, i.e., it is a non-siloxane cross-linking agent. A variety of cross-linking agents suitable for use in silicone hydrogel polymerisable compositions are known in the field (see, e.g., U.S. Pat. No. 8,231,218, incorporated herein by reference). Examples of suitable cross-linking agents include, without limitation, lower alkylene glycol di(meth)acrylates such as triethylene glycol dimethacrylate, diethylene glycol dimethacrylate, poly(lower alkylene) glycol di(meth)acrylates and lower alkylene di(meth)acrylates; divinyl ethers such as triethyleneglycol divinyl ether, diethyleneglycol divinyl ether, 1,4-butanediol divinyl ether and 1,4-cyclohexanedimethanol divinyl ether; divinyl sulfone; di- and trivinylbenzene; trimethylolpropane tri(meth)acrylate; pentaerythritol tetra(meth)acrylate; bisphenol A di(meth)acrylate; methylenebis(meth)acrylamide; triallyl phthalate; 1,3-bis(3-methacryloxypropyl)tetramethyldisiloxane; diallyl phthalate; and combinations thereof.

As will be appreciated by those skilled in the art, the polymerisable composition may comprise additional polymerisable or non-polymerisable ingredients conventionally used in contact lens formulations such as one or more of a polymerization initiator, a UV absorbing agent, a tinting agent, an oxygen scavenger, a chain transfer agent, or the like. In some examples, the polymerisable composition may include an organic diluent in an amount to prevent or minimize phase separation between the hydrophilic and hydrophobic components of the polymerisable composition, so that an optically clear lens is obtained. Diluents commonly used in contact lens formulations include hexanol, ethanol, and/or other primary, secondary or tertiary alcohols. In other examples, the polymerisable composition is free or substantially free (e.g., less than 500 ppm) of an organic diluent. In such examples, the use of siloxane monomers containing hydrophilic moieties such as polyethylene oxide groups, pendant hydroxyl groups, or other hydrophilic groups, may make it unnecessary to include a diluent in the polymerisable composition. Non-limiting examples of these and additional ingredients that may be included in the polymerisable composition are provided in U.S. Pat. No. 8,231,218.

Non-limiting examples of silicone hydrogels that may be used include comfilcon A, fanfilcon A, stenfilcon A, senofilcon A, senofilcon C, somofilcon A, narafilcon A, delefilcon A, narafilcon A, lotrafilcon A, lotrafilcon B, balafilcon A, samfilcon A, galyfilcon A, and asmofilcon A.

A specific example of a hydrogel contact lens of the present invention is one that is based on a polymerisable composition comprising from 25 wt. % to 55 wt. % of siloxane monomer(s) or macromer(s), from 30 wt. % to 55 wt. % of a vinyl monomer selected from NVP, VMA, or combinations thereof, and optionally from about 1 wt. % to about 20 wt. % of a hydrophilic monomer selected from N,N-dimethylacrylamide (DMA), 2-hydroxyethyl methacrylate (HEMA), ethoxyethyl methacrylamide (EOEMA), or ethylene glycol methyl ether methacrylate (EGMA), or any combination thereof, and optionally from about 1 wt. % to about 20 wt. % of a hydrophobic monomer selected from methyl methacrylate (MMA), isobornyl methacrylate

(IBM), or 2-hydroxybutyl methacrylate (HOB) or any combination thereof. Silicone hydrogel materials made from this specific embodiment of polymerisable composition include stenfilcon A, comfilcon A, somofilcon A, fanfilcon A, and enfilcon A. In a further example, the above-described polymerizable composition comprises the siloxanes of stenfilcon A, specifically a first siloxane having the structure represented by Formula (II), Formula (II)

m = 5-6; n = 80-90; p = 7-8 and a second siloxane having the structure represented by Formula (III),

Formula (III)

Conventional methods can be used to manufacture the contact lens of the invention. As an example, a polymerisable composition for a hydrogel composition is dispensed into a female mold member having a concave surface that defines the front surface of the contact lens. A male mold member having a convex surface that defines the back surface of the contact lens, i.e., the cornea-contacting surface, is combined with the female mold member to form a contact lens mold assembly that is subjected to curing conditions, such as UV or thermal curing conditions, under which the curable composition is formed into a polymeric lens body. The female and male mold members can be non-polar molds or polar molds. The mold assembly is disassembled (i.e., demolded) and the polymeric lens body is removed from the mold and contacted with a solvent, for instance, an organic solvent, such as ethanol, to extract unreacted components from the lens body. After extraction, the lens body is hydrated in one or more hydration liquids such as water or an aqueous solution and packaged. Exemplary methods of manufacturing silicone hydrogel contact lenses are described in U.S. Pat. No. 8,865,789.

The glycerophospholipid is typically loaded into the polymeric lens during the extraction step. Generally, after curing, the polymeric lens body is swelled in an extraction solvent, such as ethanol, which contains the glycerophospholipid. When the extracted polymeric lens body is subsequently placed in a hydration solution, such as deionized (DI) water, the extraction solvent is removed, and the glycerophospholipid remains associated with the polymeric lens body.

Examples of the extraction solvents and hydration liquids used in an extraction and hydration process can consist of denatured ethanol, a 50/50 (by vol) mixture of denatured ethanol and deionized water, and deionized water. As an example, the extraction and hydration process can involve at least one extraction step in denatured ethanol followed by a 50:50 mixture of ethanol water followed by at least one hydration step in deionized water, and wherein each extraction and hydration step can last from about 15 minutes to about 3 hours at a temperature of from about 20° C. and to about 30° C. An extraction solvent can contain the 2-oleoyl phospholipid to achieve uploading of the 2-oleoyl phospholipid to the polymeric lens body.

Any extraction solvent used as an uploading solution for the glycerophospholipid can contain a concentration of glycerophospholipid of 1-50 mg/mL, such as from 2 to 20 mg/mL. This concentration can be at least 1 mg/mL, at least 3 mg/mL, at least 5 mg/mL, or at least 10 mg/mL of glycerophospholipid. In one example, the concentration of glycerophospholipid in the extraction solvent is from about 2 to about 20 mg/mL, such as from 3 to 10 mg/ml. The amount of glycerophospholipid loaded to the polymeric lens body can be from 1 µg to 1000 µg. The amount glycerophospholipid loaded to the polymeric lens body can be at least 100 µg, at least 200 µg, or at least 500 µg. Preferably, the amount of glycerophospholipid loaded to the polymeric lens body is at least 300 µg, e.g., from 300 µg to 1000 µg.

In some examples, the glycerophospholipid, once loaded to the polymeric lens body is stable and does not substantially release from the polymeric lens body or degrade during autoclaving of the sealed contact lens package that contains the unworn hydrogel contact lens in a packaging solution, or during storage in its packaging solution. Thus, the packaging solution that the contact lens is immersed in, before autoclaving, or immediately after autoclaving, or after 1 day thereafter at 25° C., or after 30 days thereafter at 25° C., or after 60 days thereafter at 25° C., or after 120 days thereafter at 25° C., has less than 10 ppm glycerophospholipid comprising a $C_{12}$-$C_{26}$ acyl group at the sn-2 position released into the packaging solution from the contact lens or less than 5 ppm or less than 1 ppm or 0 ppm released from the contact lens into the packaging solution. Advantageously, no more than 20% by weight, especially less than 10% by weight, preferably less than 5% by weight, of the glycerophospholipid associated with the polymeric lens body is released into the packaging solution after storage for at least 1 day at 25° C. Whether the glycerophospholipid is released from a contact lens during autoclave or storage can be determined by testing for the presence of the glycerophospholipid in the packaging solution using LCMS or other suitable analytical method.

As part of the present invention, the contact lens can be sealed in a contact lens package. The packaging solution sealed within the contact lens package may be any conventional contact-lens compatible solution. In one example, the packaging solution comprises, consists, or consists essentially, of an aqueous solution of a buffer, and/or a tonicity agent. In another example, the packaging solution contains additional agents such as one or more additional antimicrobial agents, and/or a comfort agent, and/or a hydrophilic polymer, and/or a surfactant and/or other beneficial agent. In some examples, the packaging solution may comprise polysaccharides (e.g., hyaluronic acid, hydroxypropyl methylcellulose, hydroxypropyl cellulose, hydroxyethyl cellulose, etc.) or other high molecular weight polymers, such as polyvinyl pyrrolidone, which are commonly used as comfort polymers or thickening agents in ophthalmic solutions and contact lens packaging solutions. In other examples, the packaging solution may comprise an ophthalmic drug. The packaging solution can have a pH in the range of about 6.8 or 7.0 up to about 7.8 or 8.0. In one example, the packaging solution comprises phosphate buffer or borate buffer. In another example, the packaging solution comprises a tonicity agent selected from sodium chloride or sorbitol in an amount to maintain osmolality in the range of about 200 to 400 mOsm/kg, and typically from about 270 mOsm/kg up to about 310 mOsm/kg.

It will be appreciated that conventional manufacturing methods can be used to manufacture the sealed contact lens package. In a method of manufacturing a contact lens package, the method can include the step of placing an unworn contact lens and a contact lens packaging solution in a receptacle, placing a cover on the receptacle, and sealing the cover on the receptacle. Generally, the receptacle is configured to receive a single contact lens and an amount of packaging solution sufficient to completely cover the contact lens, typically about 0.5-1.5 ml. The receptacle may be made from any suitable material, such as glass or plastic. In one example, the receptacle is in the form of a plastic base member comprising a plurality of threads and the cover comprises a plastic cap member comprising a compatible set of thread for engagement with the threads of the base member thereby providing a resealable cover. It will be appreciated that other types of packaging can also be used to provide a resealable package. For example, the contact lens package may comprise a plastic cover comprising features that engage with compatible features of the receptacle to form an interference fit. The method of manufacturing the sealed contact lens package may further comprise sterilizing the unworn contact lens by autoclaving the sealed contact lens package. Autoclaving generally involves subjecting the sealed contact lens package to temperatures of at least 121° C. for at least 20 minutes.

The contact lens can be provided unworn (i.e., a new contact lens, not having been previously used by a patient), immersed in the packaging solution and sealed in a package. The package may be a blister package, glass vial, or other appropriate container. The package may comprise a base member having a cavity that retains a packaging solution, a cover that forms a liquid-tight seal with the base member and an unworn contact lens. The sealed package may be sterilized by sterilizing amounts of radiation, including heat or steam, such as by autoclaving, or by gamma radiation, e-beam radiation, ultraviolet radiation, etc.

In a specific example, the packaged contact lens is sterilized by autoclaving.

The final product can be a sterile, packaged contact lens (e.g., silicone hydrogel contact lens) having ophthalmically-acceptable surface wettability.

The $C_{12}$-$C_{26}$ fatty acid-releasing hydrogel contact lens described herein can be used to correct vision of a symptomatic contact lens wearer. For example, the $C_{12}$-$C_{26}$ fatty acid-releasing hydrogel contact lens contact lens of the invention can increase the duration of comfortable contact lens wearing time in a symptomatic contact lens wearer. References herein to a "symptomatic contact lens wearer" or "symptomatic subject" refers to a lens wearer that is classified as symptomatic using the CLDEQ-8 as described by Chalmers et al (see Chalmers et al., *Contact Lens Dry Eye Questionnaire-8 (CLDEQ-8) and opinion of contact lens performance*. Optom Vis Sci 2012; 89(10):1435-1442.). The $C_{12}$-$C_{26}$ fatty acid-releasing hydrogel contact lens described herein can be worn by a contact lens wearer to reduced lens awareness and/or result in fewer "lens awareness events" during the day compared to a control lens or the contact lens wearer's habitual lenses. References herein to a "control lens" refer to a contact lens that contains no phospholipid or $C_{12}$-$C_{26}$ fatty acid but is otherwise identical to the $C_{12}$-$C_{26}$ fatty acid-releasing lens to which it is being compared. A reduction in lens awareness and/or lens awareness events during contact lens wear can be determined using a "lens awareness logger" as described by Read et al. (see Read et al., *Monitoring ocular discomfort using a wrist-mounted electronic logger*. Contact Lens and Anterior Eye Vol. 43 (2020) 476-483.

EXAMPLES

The following examples illustrate certain aspects and advantages of the present invention, which should be understood not to be limited thereby.

Example 1. Assay for Testing Susceptibility of Phospholipid Digestion by sPLA$_2$-IIA Each phospholipid-loaded lens is removed from its package and placed in a 6 mL glass vial containing 5 mL of the ATF described in Example 2 at room temperature on a shaker at 125 rpm overnight to elute any free fatty acid that may be present in the lens.

Each lens is rinsed in a 6 ml glass vial containing a fresh aliquot of 5 mL ATF for 30 minutes prior to running the digestion assay.

A 50 ppm solution of sPLA$_2$ is prepared in ATF by adding 200 μl ATF to a tube containing 10 μg recombinant human PLA2G2A (Creative BioMart, Cat. No. PLA2G2A-669H). The solution is referred to as ATF+sPLA2. As an option, human reflex tear may be used instead of ATF+sPLA2. Two 4 mm pieces are cut from each lens. One piece of each lens is placed in a tube with 100 μL ATF and the other piece is placed in a tube containing 100 μL ATF+sPLA2. The tubes are incubated at 35±2° C. for 4 hours with no shaking.

50 μl of the release media from each lens at T=4 hr is transferred to HPLC vials and 500 μl isopropanol (IPA) is added and mixed well. T=0 hr HPLC vials are also prepared (50 µl ATF+500 µl IPA). All vials are sonicated for 15 minutes and centrifuged. The supernatant is removed for LCMS injection.

The supernatants are injected on an LCMS instrument equipped with an ACQUITY UPLC BEH C18 1.7 µg, 2.1 mm×15 cm column and running a mobile phase gradient from 65% A to 90% B at a flow rate of 0.35 mL/min with A=40% acetonitrile in water with 10 mM ammonium acetate and 0.2% (v/v) ammonium hydroxide, and B=10% acetonitrile in IPA with 10 mM ammonium acetate and 0.2% (v/v) ammonium hydroxide. The mass spec detector is run at negative electrospray mode. The peak for the particular fatty acid of interest in the supernatants (i.e., the fatty acid that is released from the sn-2 position of the phospholipid in the contact lens) is measured. The ratio of fatty acid peak area in ATF with and without sPLA2 is calculated.

Example 2. sPLA2-Mediated Phospholipid Digestion from Stenfilcon A Lenses Loaded with Different Phospholipids The phospholipids shown in Table 1 were obtain from Avanti Polar Lipids. 3 mg/ml loading solutions of the phospholipids shown in Table 1 were prepared by adding 2.4 mL ethanol to 9 mg of phospholipid, sonicating (up to 14 minutes) then adding 0.6 mL DI water and sonicating again (up to 15 minutes) to dissolve the phospholipid.

TABLE 1

| Phospholipid | Abbreviation | Cat. No. |
|---|---|---|
| 1,2-dioleoyl-sn-glycero-3-phospho-L-serine (sodium salt) | DOPS | 840035P |
| 1,2-dioleoyl-sn-glycero-3-phospho-(1'-rac-glycerol) (sodium salt) | DOPG | 840475P |
| 1,2-dioleoyl-sn-glycero-3-phosphocholine | DOPC | 850375P |
| 1,2-dioleoyl-sn-glycero-3-phosphoethanolamine | DOPE | 850725P |

Hydrated contact lenses made from stenfilcon A were washed three times in 3 mL purified water for 30 minutes each time. Each washed lens was placed in 3 mL of a phospholipid loading solution and incubated at room temperature with gentle shaking at 75 rpm for 3 hours. The loaded lenses were then rinsed and hydrated in several exchanges of DI water. The lenses were packaged in a buffered saline contact lens packaging solution and autoclaved.

An artificial tear fluid (ATF) was prepared by adding the first three ingredients listed in Table 2 to a clean class vial and then adding 30 mL of the fourth ingredient.

TABLE 2

| Ingredient | Vendor | Cat. No. | Amount | Concentration (mg/ml) |
|---|---|---|---|---|
| Bovine Serum Albumin (fatty acid-free) | Akron Biotech | AK8909 | 60 mg | 2.0 |
| Lysozyme | Sigma Aldrich | L6876 | 57 mg | 1.9 |
| Mucin | Sigma Aldrich | MJ3895 | 4.5 mg | 0.15 |
| Dulbecco's PBS (DPBS) | Sigma Aldrich | 850725P | 30 ml | |

After autoclaving, each lens was tested for susceptibility to phospholipid digestion by $sPLA_2$-IIA using the method described in Example 1. The peak for oleic acid (OA) in the supernatants sent for LCMS analysis were measured (m/z trace=281.24). The ratio of OA in ATF with and without sPLA2 was calculated. The results are shown in Table 3.

TABLE 3

Oleic acid peak areas in ATF with and without sPLA2.

| Sample | ATF | ATF + sPLA2 | Ratio |
|---|---|---|---|
| DOPG | 36 | 9958 | 279 |
| DOPE | 463 | 2127 | 4.6 |
| DOPC | 102 | 125 | 1.2 |
| DOPS | 88 | 1437 | 16.4 |

The results suggest that contact lenses loaded with 2-oleoyl phosphatidylcholines are not susceptible to sPLA2-mediated degradation and fatty acid release whereas contact lenses loaded with phosphatidylglycerols, phosphatidylethanolamines, and phosphatidylserines are susceptible to sPLA2-mediated fatty acid release.

Example 3. DOPG-Loaded Stenfilcon A Contact Lenses 1,2-Dioleoyl-sn-glycero-3-phospho-rac-(1-glycerol) sodium salt (DOPG) from Sigma-Aldrich was dissolved into a 50% by volume ethanol (EtOH) 50% by volume deionised water solution and sonicated until the DOPG was fully dissolved to provide DOPG loading solutions ranging in concentration from 1 mg/ml to 10 mg/ml.

Silicone hydrogel contact lenses were prepared by curing the formulation for stenfilcon A in polypropylene contact lens molds. The cured stenfilcon A was removed from the molds, and each lens was extracted in EtOH to remove unreacted monomer. The lenses were then placed in the DOPG loading solutions for about 90 minutes and then hydrated in several exchanges of DI water. The lenses were packaged in plastic blisters with about 1.2 ml of a packaging solution comprising phosphate buffered saline (PBS) and autoclaved.

The amount of DOPG in each lens was determined by extracting the lens with isopropanol (IPA) and measuring DOPG in the extract by LCMS. Briefly, each lens was removed from its blister pack, lightly blotted to remove excess packaging solution, and placed in a 20 mL glass vial containing 10 mL 100% IPA. The vials were placed on a bench top shaker at 300 rpm overnight (~16 hours) at room temperature. For stenfilcon A, a single 2 hour extraction step is sufficient to extract substantially all the DOPG from the lense. Silicone hydrogel lens materials that are more hydrophobic may require a second overnight extraction in order to extract all the DOPG, in which case the IPA from the first extraction step is removed and replaced with 3 mL fresh IPA and shaken overnight at 300 rpm at room temperature. The amount of DOPG in the IPA extract from each lens is determined by LCMS compared to a DOPG standard solution. The DOPG loading concentrations and average DOPG in each lens are shown in Table 4.

TABLE 4

| DOPG loading concentration | Average amount of DOPG/lens |
|---|---|
| 1.0 mg/mL | 240 μg |
| 2.5 mg/mL | 495 μg |
| 5.0 mg/mL | 760 μg |
| 7.5 mg/ml | 895 μg |
| 10.0 mg/ml | 975 μg |

Example 4. Determining Fatty Acid Release Profiles

To determine the fatty acid release profile of a silicone hydrogel contact lens loaded with a glycerophospholipid comprising a $C_{12}$-$C_{26}$ acyl group at the sn-2 position, the lens is removed from its package and placed in a 6 mL glass vial containing 5 mL of ATF (described in Example 1) at room temperature on a shaker at 125 rpm overnight to elute any free fatty acid that may be present in the lens.

Each lens is then transferred to a 6 mL glass vial containing 3 mL of the ATF+sPLA2 in vitro release media described in Example 1 at 35° C. As an alternative, phospholipase $A_2$ from honeybee venom (CAS No. 9001-84-7) may be used in place of the recombinant human PLA2G2A at the same concentration (50 ppm). The vials are placed on a shaker at 50 rpm in a 35° C. incubator, and at 2-hour increments (e.g., 2 hr, 4 hr, 6 hr, 8 hr and 10 hr). 2.5 ml of the in vitro release media is removed from each vial and submitted for analysis. If the release media is not to be analysed right away at that specific time point, a sample is taken and mixed with IPA (1:10 v/v ratio) to stop enzymatic activity. Following that, 2.5 ml of fresh ATF+sPLA2 in vitro release media is added back to each vial and the lens is continued to be incubated. At the end of the release experiment, the amount of fatty acid in the release media at each timepoint is analysed by LCMS using the method described in Example 1.

Example 5. Oleic Acid Release from a 5 mg/mL DOPG-Loaded Contact Lens (Lens A) and from a 3 mg/mL DOPG-Loaded Contact Lens (Lens B)

Figure 2:
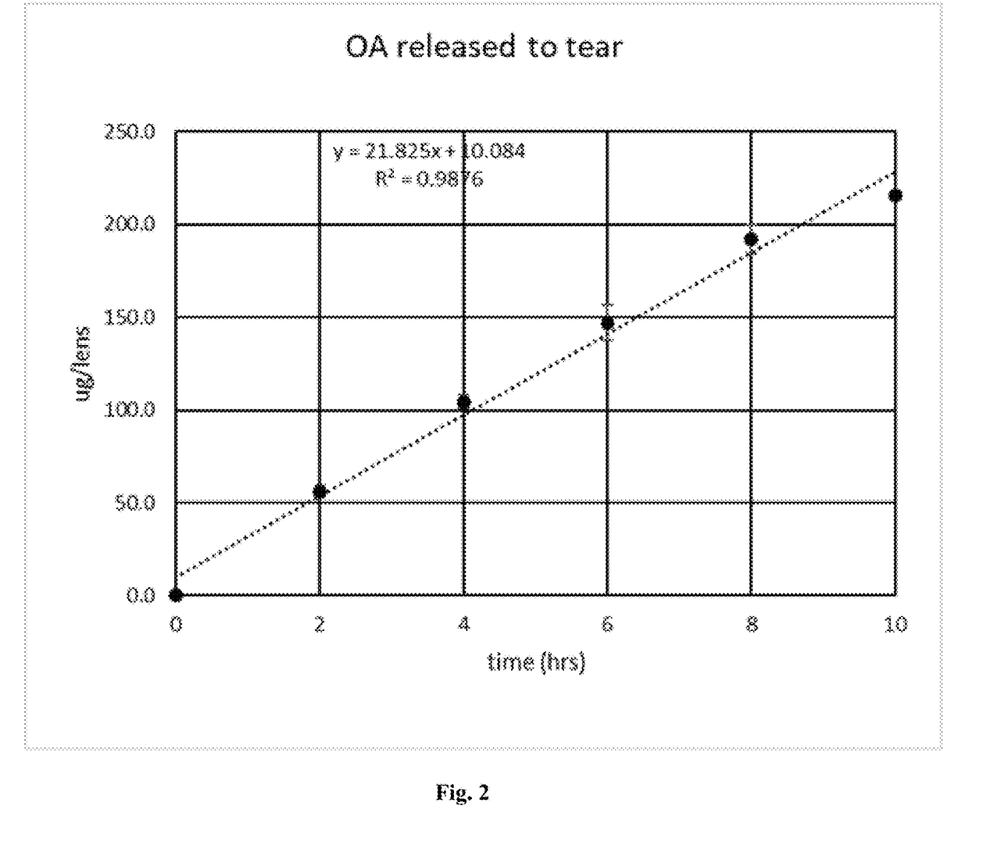
FIG. 2 depicts the oleic acid release profile of a 5 mg/mL DOPG-loaded silicone hydrogel contact lens (lens A) in ATF with 50 ppm PLA$_2$ enzyme solution.
Figure 3:
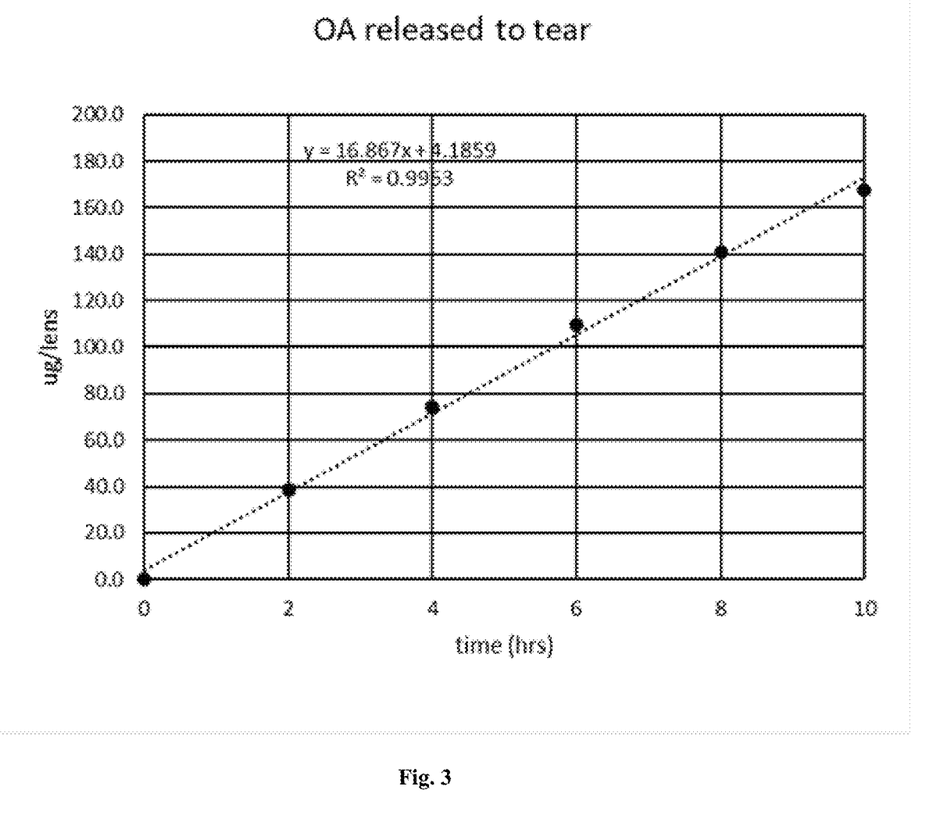
FIG. 3 depicts the oleic acid release profile of a 3 mg/mL DOPG-loaded silicone hydrogel contact lens (lens B) in ATF with 50 ppm sPLA$_2$ enzyme solution.

Silicone hydrogel contact lenses were prepared as in Example 2 using 5 mg/mL DOPG loading concentration (lens A) and 3 mg/mL DOPG loading concentration (lens B). The oleic acid release rate of lenses A and B was determined using the method of Example 4 with ATF release medium contained 50 ppm bee venom sPLA2 enzyme (CAS No. 9001-84-7). The oleic acid release into the in vitro release media samples were tracked every 2 hours, as shown in FIGS. 2 and 3 for lenses A and B, respectively. Results are shown in Table 5, where the cumulative oleic acid release (from T=0) at each time point is given.

TABLE 5

| Time | Lens A - average cumulative amount of OA release | Lens B - average cumulative amount of OA release |
|---|---|---|
| 2 h | 53.7 μg | 38.5 μg |
| 4 hr | 101.2 μg | 75.6 μg |
| 6 hr | 148.3 μg | 110.4 μg |
| 8 hr | 190.5 μg | 141.1 μg |
| 10 hr | 210.3 μg | 165.8 μg |

The results show that a constant release of oleic acid was sustained for both lenses A and B for at least 10 hours. The approximate elution rate of oleic acid from lenses A and B is shown in Table 6.

TABLE 6

| Lens | DOPG loading concentration | Average release rate of OA/lens |
|---|---|---|
| A | 5 mg/mL | about 22 μg/hr |
| B | 3 mg/mL | about 17 μg/hr |

Example 6. Release of DHA from Different DHAPG-Loaded Silly Lenses

Contact lenses prepared from stenfilcon A and somofilcon A were soaked in a 3 mg/mL DHAPG (1,2-didocosahexaenoyl-sn-glycero-3-[phospho-rac-(1-glycerol)] (sodium salt) from Avanti Polar Lipids) dissolved in 50% ethanol. DHA release from the DHAPG-loaded lenses was tested using the digestion assay of Example 1, except that ATF+sPLA2 reflex tear obtained from a single individual was used.

The % DHAPG digested after 4 hours was determined based on the total DHA and DHAPG found in the digestion sample, by the following equations.

Digested DHAPG=(DHA found*MW of DHAPG)/(MW of DHA)

Total DHAPG=Digested DHAPG+DHAPG found

% digestion=Digested DHAPG/Total DHAPG

The results are shown in Table 7 and indicate that lens material can impact sPLA2-mediate glycerophospholipid digestion rates.

TABLE 7

| Lens material | Remaining DHAPG (ug/lens piece) | Total DHA produced (ug/lens piece) | % Digestion | Average % Digestion |
|---|---|---|---|---|
| stenfilcon A | 55.71 | 5.78 | 17% | 15% |
| stenfilcon A | 57.96 | 4.43 | 13% | |
| somofilcon A | 40.46 | 6.49 | 27% | 25% |
| somofilcon A | 43.30 | 5.98 | 23% | |

The disclosure herein refers to certain illustrated examples, it is to be understood that these examples are presented by way of example and not by way of limitation. The intent of the foregoing detailed description, although discussing exemplary examples, is to be construed to cover all modifications, alternatives, and equivalents of the examples as may fall within the spirit and scope of the invention as defined by the additional disclosure.

References herein to "an example" or "a specific example" or "an aspect" or "an embodiment" or similar phrase, are intended to introduce a feature or features of the $C_{12}$-$C_{26}$ fatty acid-releasing hydrogel contact lens of the invention or components thereof, the sealed contact lens package or components thereof, or method of manufacturing the $C_{12}$-$C_{26}$ fatty acid-releasing hydrogel contact lens of the invention (depending on context) that can be combined with any combination of previously-described or subsequently-described examples, aspects, embodiments (i.e. features), unless a particular combination of features is mutually exclusive, or if context indicates otherwise. Further, as used in this specification, the singular forms "a," "an," and "the" include plural referents (e.g., at least one or more) unless the context clearly dictates otherwise. Thus, for example, reference to a "contact lens" includes a single lens as well as two or more of the same or different lenses.

The entire contents of all cited references in this disclosure, to the extent that they are not inconsistent with the present disclosure, are incorporated herein by reference.

The present invention can include any combination of the various features or embodiments described above including the above numbered clauses and/or in the claims below as set forth in sentences and/or paragraphs. Any combination of disclosed features herein is considered part of the present invention and no limitation is intended with respect to combinable features.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. An unworn silicone hydrogel contact lens sealed in a package, the contact lens comprising a polymeric lens body loaded with at least one glycerophospholipid comprising a $C_{12}$-$C_{26}$ acyl group at the sn-2 position, wherein the glycerophospholipid is susceptible to digestion by secretory phospholipase 2-acylhydrolase (sPLA$_2$) enzymes found in human tears when present in the polymeric lens body and/or the silicone hydrogel contact lens releases $C_{12}$-$C_{26}$ fatty acid and salts thereof when in contact with a solution comprising sPLA$_2$-IIA, wherein $C_{12}$-$C_{26}$ fatty acid is a digestion product of the glycerophospholipid.

2. The contact lens of claim 1, wherein the glycerophospholipid is of the formula (I):

Formula (I)

in which X is either —O— or —O(CO)—, $R^1$ and $R^2$ are each independently a $C_{11\text{-}25}$ alkyl group and $R^3$ group is selected from hydrogen, $C_{1\text{-}10}$ polyol, ethanolamine and serine, and salts thereof.

3. The contact lens of claim 1, wherein the glycerophospholipid is a phosphatidylserine, phosphatidylethanolamine or phosphatidylglycerol.

4. The contact lens of claim 1, wherein the hydrogel is neutral or cationic.

5. The contact lens of claim 1, wherein the polymeric lens body is a reaction product of a polymerisable composition that comprises at least one hydrophilic monomer comprising a vinyl group.

6. The contact lens of claim 1, wherein the polymeric lens body is a reaction product of a polymerisable composition that comprises a first siloxane having the structure represented by Formula (II), Formula (II)

m = 5-6; n = 80-90; p = 7-8 and a second siloxane having the structure represented by Formula (III)

Formula (III)

7. The contact lens of claim 1, wherein the glycerophospholipid is 1,2-dioleoyl phosphatidylglycerol, 1-palmitoyl- 2-oleoyl phosphatidylglycerol, 1-stearoyl-2-oleoyl or 1,2-didocosahexaenoyl phosphatidylglycerol.

8. The contact lens of claim 1, wherein the polymeric lens body is loaded with an amount of from 1 μg to 1000 μg, preferably at least 25 μg, more preferably at least 300 μg, glycerophospholipid.

9. The contact lens of claim 1, wherein when immersed in a release media comprising artificial tear fluid containing 50 ppm sPLA$_2$-IIA at 35° C., the contact lens sustains the release of at least 0.1 μg/hr C$_{12}$-C$_{26}$ fatty acid, especially at least 0.5 μg/hr C$_{12}$-C$_{26}$ fatty acid, for at least 4 hours, such as for at least 8 hours, optionally for at least 10 hours.

10. The contact lens of claim 1, wherein the glycerophospholipid is of the formula (I):

Formula (I)

in which X is either —O— or —O(CO)—, R$^1$ and R$^2$ are each independently a C$_{13-21}$ alkyl and R$^3$ group is selected from hydrogen, C$_{1-10}$ polyol, ethanolamine and serine, and salts thereof.

11. The contact lens of claim 1, wherein the package comprises:
 (a) a base member having a cavity that retains a packaging solution; and
 (b) a cover that forms a liquid-tight seal with the base member.

12. A method of making a silicone hydrogel contact lens comprising a polymeric lens body loaded with a glycerophospholipid, wherein the glycerophospholipid is a glycerophospholipid comprising a C$_{12}$-C$_{26}$ acyl group at the sn-2 position, and wherein the glycerophospholipid is susceptible to digestion by secretory phospholipase 2-acylhydrolase (sPLA$_2$) enzymes found in human tears when present in the polymeric lens body and/or the silicone hydrogel contact lens releases C$_{12}$-C$_{26}$ fatty acid which is a digestion product of the glycerophospholipid, and salts thereof, when in contact with a solution comprising SPLA$_2$-IIA,
 the method comprising: a) polymerizing a polymerisable composition in a contact lens mold to obtain the polymeric lens body, b) removing the polymeric lens body from the contact lens mold, c) extracting the polymeric lens body in an organic solvent comprising a glycerophospholipid comprising a C$_{12}$-C$_{26}$ acyl group at the sn-2 position, d) hydrating the polymeric lens body in a hydration liquid to obtain the hydrogel contact lens, e) sealing the hydrogel contact lens with packaging solution in a package and, optionally, f) autoclaving the package.

13. A method for correcting vision of a symptomatic contact lens wearer, the method comprises wearing a silicone hydrogel contact lens comprising a polymeric lens body loaded with a glycerophospholipid comprising a C$_{12}$-C$_{26}$ acyl group at the sn-2 position, by the symptomatic contact lens wearer, wherein the glycerophospholipid is susceptible to digestion by secretory phospholipase 2-acylhydrolase (sPLA$_2$) enzymes found in human tears when present in the polymeric lens body and/or the silicone hydrogel contact lens releases C$_{12}$-C$_{26}$ fatty acid and salts thereof when in contact with a solution comprising SPLA$_2$-IIA, wherein C$_{12}$-C$_{26}$ fatty acid is a digestion product of the glycerophospholipid.

14. The method of claim 13, wherein the symptomatic contact lens wearer has an increased duration of comfortable contact lens wearing time compared to a control lens.

15. The method of claim 13, wherein the symptomatic contact lens wearer has reduced lens awareness and/or fewer "lens awareness events" during the day compared to a control lens.

16. Use of an amount of a glycerophospholipid comprising a C$_{12}$-C$_{26}$ acyl group at the sn-2 position to enhance the comfort of a silicone hydrogel contact lens, wherein the phospholipid is associated with a polymeric lens body of the silicone hydrogel contact lens, and wherein the glycerophospholipid is susceptible to digestion by secretory phospholipase 2-acylhydrolase (sPLA$_2$) enzymes found in human tears when present in the polymeric lens body and/or the silicone hydrogel contact lens releases C$_{12}$-C$_{26}$ fatty acid which is a digestion product of the glycerophospholipid, and salts thereof, when in contact with a solution comprising sPLA$_2$-IIA.

17. The use of claim 16, wherein the silicone hydrogel contact lens comprises a polymeric lens body loaded with a glycerophospholipid comprising a C$_{12}$-C$_{26}$ acyl group at the sn-2 position.

18. The use of claim 16, wherein the sensation of lens awareness is reduced in a contact lens wearer, thereby enhancing the comfort of the contact lens in the symptomatic contact lens wearer and/or increasing the duration of comfortable contact lens wearing time in a symptomatic contact lens wearer.

19. A silicone hydrogel composition for use in reducing the sensation of lens awareness in a contact lens wearer, thereby enhancing the comfort of the contact lens in the contact lens wearer and/or increasing the duration of comfortable contact lens wearing time in a contact lens wearer, the composition comprising (a) a polymeric lens body that is a reaction product of a polymerisable composition, loaded with (b) an amount of glycerophospholipid comprising a C$_{12}$-C$_{26}$ acyl group at the sn-2 position, wherein the glycerophospholipid is susceptible to digestion by secretory phospholipase 2-acylhydrolase (sPLA$_2$) enzymes found in human tears when present in the polymeric lens body and/or the silicone hydrogel contact lens releases C$_{12}$-C$_{26}$ fatty acid and salts thereof when in contact with a solution comprising sPLA$_2$-IIA, wherein C$_{12}$-C$_{26}$ fatty acid is a digestion product of the glycerophospholipid.

20. The silicone hydrogel composition for use of claim 19, wherein the composition is in the form of a contact lens comprising a polymeric lens body loaded with a glycerophospholipid comprising a C$_{12}$-C$_{26}$ acyl group at the sn-2 position.

* * * * *